(12) United States Patent
Wakabayashi et al.

(10) Patent No.: US 9,457,764 B2
(45) Date of Patent: Oct. 4, 2016

(54) SEATBELT THROUGH-ANCHOR AND SEATBELT DEVICE

(71) Applicant: Autoliv Development AB, Vårgårda (SE)

(72) Inventors: Shinichi Wakabayashi, Yokohama (JP); Yosuke Kono, Yokohama (JP); Toshihito Natori, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/777,992

(22) PCT Filed: Jan. 21, 2014

(86) PCT No.: PCT/JP2014/051050
§ 371 (c)(1),
(2) Date: Sep. 17, 2015

(87) PCT Pub. No.: WO2014/148088
PCT Pub. Date: Sep. 25, 2014

(65) Prior Publication Data
US 2016/0137161 A1 May 19, 2016

(30) Foreign Application Priority Data
Mar. 21, 2013 (JP) ................................. 2013-057975

(51) Int. Cl.
*B60R 22/24* (2006.01)
*B60R 22/18* (2006.01)

(52) U.S. Cl.
CPC ........ *B60R 22/24* (2013.01); *B60R 2022/1818* (2013.01)

(58) Field of Classification Search
CPC ...................... B60R 22/24; B60R 2022/1818
See application file for complete search history.

(56) References Cited

U.S. PATENT DOCUMENTS

| | | | |
|---|---|---|---|
| 2003/0015865 A1* | 1/2003 | Tomita | B60R 22/24 280/808 |
| 2013/0240662 A1* | 9/2013 | Ito | B60R 22/24 242/615.3 |
| 2014/0306436 A1* | 10/2014 | Toyama | B60R 22/24 280/801.1 |

FOREIGN PATENT DOCUMENTS

| | | |
|---|---|---|
| JP | 2002-200964 | 7/2002 |
| JP | 2008-260415 | 10/2008 |
| JP | 2011-79339 | 4/2011 |

* cited by examiner

*Primary Examiner* — Drew Brown
(74) *Attorney, Agent, or Firm* — Brinks Gilson & Lione

(57) ABSTRACT

The present invention provides a seatbelt through-anchor and device capable of preventing jamming during an emergency. A through-anchor is rotatably attached to a vehicle interior wall and is folded back after a webbing extracted from a retractor is inserted through the through-anchor. The through-anchor includes: an insertion hole including an approximately linear lower edge on which the webbing slides, and a lateral edge curving from an end part of the lower edge; a lower-side part provided below the lower edge; and a bump part extending from an end of the lower-side part, protruding beyond a surface of the lower-side part in a direction corresponding to a vehicle interior side. The bump part includes peak parts protruding the furthest in the course of separating from the lateral edge, and includes, between each of the peak parts and the lateral edge, a first sliding surface including a curved surface outwardly protruding from the through-anchor.

12 Claims, 13 Drawing Sheets

(a)

(b)

(a)

(b)

(a)

(b)

(c)

(a)

A-A (b)

(a)

(b)

(a)

(b)

(c)

(a)

P-P'
(b)

Q-Q'
(c)

SEATBELT THROUGH-ANCHOR AND SEATBELT DEVICE

CROSS REFERENCE TO RELATED APPLICATIONS

This application claims priority to Japanese Patent Application No. 2013-057975, filed on Mar. 21, 2013; and PCT International Patent Application No. PCT/JP2014/051050, filed on Jan. 21, 2014.

BACKGROUND OF THE INVENTION

1. Field of the Invention

The present invention relates to a seatbelt through-anchor through which a webbing for restraining an occupant is inserted and to a seatbelt device including the seatbelt through-anchor.

2. Description of the Related Art

A seatbelt device is installed to a seat of a vehicle. The seatbelt device is a safety device that restrains an occupant using a webbing, and prevents the occupant from being propelled forward by inertial force when a large deceleration acts on the vehicle due to a sudden stop or a collision.

The webbing is pulled out upward inside the vehicle from a retractor that winds up the webbing, passed through a through-anchor fixed to a vehicle body, and folded back downward inside the vehicle. An anchor plate to be fixed to a lower part of the interior of the vehicle is attached to a tip part of the folded-back webbing.

In addition, a tongue plate through which the webbing is inserted and which is capable of sliding over the webbing is arranged between the through-anchor and the anchor plate. Furthermore, a buckle is provided at a side part (center side of the vehicle) of the vehicle seat.

A worn state of the seatbelt device is created as the occupant grasps the tongue plate, pulls out the webbing from the retractor, and inserts the tongue plate into the buckle, whereby the seatbelt device restrains the occupant with the webbing.

With such a seatbelt device, there is a problem that so-called jamming occurs in which, during an emergency such as a collision of a vehicle, a webbing that is abruptly wound up by or pulled out from a retractor is moved to one side of an insertion hole of a through-anchor. Once jamming occurs, the webbing can no longer be pulled out or wound up in a smooth manner.

Japanese Patent Application Laid-open No. 2002-208043 describes a through-anchor provided with a protrusion on a vehicle exterior side or a wall side of a vehicle interior of the through-anchor. The through-anchor is intended to prevent jamming by hooking a webbing to the protrusion of the through-anchor.

Japanese Patent Application Laid-open No. 2000-142317 describes a through-anchor which is provided with a protrusion (straightening plate) on a vehicle interior side of the through-anchor and which is configured to prevent a webbing from twisting when the webbing is wound up after an occupant removes the webbing.

SUMMARY OF THE INVENTION

By being inserted through an insertion hole of a through-anchor, a webbing is divided across the insertion hole into a webbing positioned on a vehicle interior side along a direction in which the webbing is pulled out and a second webbing which continues from the webbing and which is positioned on a retractor side (wall side). Therefore, with the through-anchor described in Japanese Patent Application Laid-open No. 2002-208043, there is a risk that the wall-side webbing may become caught by the protrusion.

During a vehicle emergency such as a collision by the vehicle, after a pretensioner operates and the wall-side webbing is temporarily pulled in, an occupant moves forward and applies weight to the vehicle interior-side webbing. As a result, the vehicle interior-side webbing is also abruptly pulled out. Since the vehicle interior-side webbing restrains a vicinity of a shoulder of the occupant, as the occupant moves, the vehicle interior-side webbing is pulled out forward while maintaining a height of the shoulder part. Therefore, the vehicle interior-side webbing exhibits behavior approaching a more horizontal state.

In order to prevent jamming during a vehicle emergency, the through-anchor must rotate in accordance with a change in an angle formed between the vehicle interior-side webbing that is pulled out forward and the wall-side webbing. However, since the technique described in Japanese Patent Application Laid-open No. 2002-208043 involves a protrusion on a wall side of the through-anchor, rotation of the through-anchor is inhibited by the wall-side webbing. On the other hand, the vehicle interior-side webbing itself is still pulled forward and attempts to rotate the through-anchor while attempting to approach a horizontal state. Therefore, with the through-anchor described in Japanese Patent Application Laid-open No. 2002-208043, a risk remains that the webbing may become eccentrically located at one portion of the insertion hole at a moment where a balance between a force that inhibits the rotation and a force that causes the rotation is disrupted and may cause jamming.

With the through-anchor described in Japanese Patent Application Laid-open No. 2000-142317, although a straightening plate is provided on a vehicle interior side of the through-anchor, the straightening plate only assumes an operation when retracting the webbing and does not assume a situation where a larger force acts during a vehicle emergency. In addition, the straightening plate is provided at a position separated from the insertion hole. Therefore, in a situation where the webbing is horizontally pulled out forward during a vehicle emergency, the straightening plate is unable to act on a force that causes the webbing itself to move to one side in the insertion hole. In other words, in principle, the straightening plate does not have a function of preventing jamming.

On the other hand, in a situation where the occupant moves forward and the webbing is approximately horizontally pulled out forward during a vehicle emergency, the through-anchor receives a load that is large enough to cause twist deformation of a torsion bar inside the retractor. In this regard, since the straightening plate described in Japanese Patent Application Laid-open No. 2000-142317 is nothing more than a plate member provided at a position separated from the insertion hole, the straightening plate cannot withstand the large load that is applied during a vehicle emergency in terms of strength. As a result, with the through-anchor described in Japanese Patent Application Laid-open No. 2000-142317, a deformation of the straightening plate itself may occur during a vehicle emergency. Therefore, the straightening plate may be unable to prevent jamming in this respect as well.

The present invention has been made in consideration of the problems described above and an object thereof is to provide a seatbelt through-anchor and a seatbelt device capable of preventing jamming during a vehicle emergency.

In order to solve the problems described above, a typical configuration of a seatbelt through-anchor according to the present invention is such that the seatbelt through-anchor is rotatably attached to a vehicle interior wall and is folded back after a band-shaped webbing extracted from a retractor is inserted through the seatbelt through-anchor, the seatbelt through-anchor including: an insertion hole through which the webbing is inserted, the insertion hole including an approximately linear lower edge which comes into contact with a surface of the webbing so as to traverse the webbing and on which the webbing slides, and a lateral edge extending in a curve from an end part of the lower edge; a lower-side part provided below the lower edge; and a bump part provided on a surface of the through-anchor so as to extend from a vicinity of an end of the lower-side part in a lateral direction of the through-anchor and protruding beyond a surface of the lower-side part in a direction corresponding to a vehicle interior side when the through-anchor is installed, wherein the bump part includes peak parts protruding the furthest in the course of separating from the lateral edge, and the bump part includes, between each of the peak parts and the lateral edge, a first sliding surface including at least a curved surface outwardly protruding from the through-anchor.

Other than during a vehicle emergency, the webbing comes into contact with the lower edge of the insertion hole and slides. During an emergency such as a collision, an occupant moves to the vehicle front side due to inertia, and the webbing having restrained a vicinity of a shoulder part of the occupant up until then exhibits a behavior approaching a more horizontal state while being abruptly pulled out. Therefore, an angle formed between a webbing positioned on a wall side and a webbing positioned on a vehicle interior side across the insertion hole (hereinafter, a webbing opening angle) changes.

When the webbing opening angle increases and the webbing approaches a horizontal state, the webbing is not simply arranged along the wall. When viewed from above, an angle formed between the webbing and the wall also increases. In other words, during an emergency, the webbing moves to an end part of the lower edge of the insertion hole (vehicle front side) with which the webbing has been in contact while separating from the lower edge. In addition, the webbing moves so as to cover (climb) the lateral edge extending from the end part of the lower edge while coming into contact with the lateral edge. Moreover, "lateral" or a "lateral direction" as used in the present application refers to a direction extending left or right with respect to a center line that connects a center of a bolt hole and a center in a horizontal direction of the insertion hole in a front view of the through-anchor as viewed from a vehicle interior side when the through-anchor is installed on the vehicle. Among up and down, a ceiling direction of the vehicle is assumed to be "up" and a floor direction of the vehicle is assumed to be "down". These terms representing positions are based on a positional relationship of the through-anchor with respect to the vehicle upon installation.

According to the configuration described above, the lower-side part is provided below the lower edge of the insertion hole, and a bump part protruding beyond a surface of the lower-side part is also provided. Furthermore, the bump part includes a first sliding surface formed between peak parts protruding the furthest in the course of separating from the lateral edge and the lateral edge. The first sliding surface is configured to include at least a curved surface that outwardly protrudes from the through-anchor. Therefore, while the webbing exhibits a behavior of separating from the lower edge and reducing contact area when climbing the lateral edge, the webbing slides with respect to the bump part and smoothly climbs the first sliding surface while maintaining contact with a wide area of the bump part and can reach the peak parts.

As described above, although the webbing separates from the lower edge of the insertion hole during a vehicle emergency, the webbing maintains surface contact with the bump part over a wide range while smoothly climbing the first sliding surface of the bump part. With the webbing that smoothly climbs the first sliding surface while maintaining surface contact with the bump part over a wide range, movement with respect to the through-anchor is suppressed by friction force created by the climbing of the webbing. In a situation where the occupant is moving forward such as during a vehicle emergency, the webbing itself is still pulled forward and attempts to approach a horizontal state. Therefore, the webbing is capable of applying a force that causes the through-anchor to rotate (hereinafter, a rotational force) via the first sliding surface of the bump part with which the webbing is in surface contact. Due to the action of the rotational force and the like, the webbing is prevented from excessively climbing the first sliding surface of the bump part. As a result, since the through-anchor rotates, jamming in which the webbing is moved to one side in the insertion hole of the through-anchor can be prevented.

Furthermore, since the through-anchor is easily given rotational force by the bump part, the through-anchor can be more easily rotated when pulling out the webbing during normal use which is besides a vehicle emergency. Therefore, the through-anchor rotates every time the webbing is pulled out and the pull-out angle of the webbing is likely to be an optimum angle with respect to the through-anchor. In this case, an optimum angle refers to an angle in a range where the webbing can come into contact with the lower edge of the insertion hole of the through-anchor and slide when the webbing is pulled out during normal use.

With a conventional through-anchor not provided with a bump part, insufficient rotation of the through-anchor when the webbing is being pulled out causes the through-anchor itself to act as resistance with respect to the webbing being pulled out. With a conventional through-anchor, when the webbing is pulled out, the webbing comes into contact with the lower edge of the insertion hole and can hardly slide. As a result, a pull-out force of the webbing cannot be sufficiently reduced.

In contrast, with the through-anchor according to the present invention, the rotational force given by the bump part enables the through-anchor to rotate with the pulling out of the webbing during normal use. Therefore, the through-anchor is less likely to act as a resistance with respect to the pulled-out webbing, and since this enables the webbing to slide while always being in contact with the lower edge of the insertion hole, a pull-out force of the webbing can be reduced. As a result, with the through-anchor according to the present invention, not only can jamming be prevented during a vehicle emergency but a pull-out force of the webbing can also be reduced during normal use.

Preferably, when the portion protruding from the lower-side part of the bump part is viewed in a cross section including the lower-side part, a foot part of the bump part has a shape that is outwardly receding from the through-anchor and a vicinity of each of the peak parts has a shape that is outwardly protruding from the through-anchor, and the bump part further includes a second sliding surface configured such that the receding shape and the protruding shape are smoothly connected to each other. Since the foot part and the peak parts of the bump part are smoothly connected to each other by the second sliding surface in this manner, the webbing smoothly climbs the second sliding surface and reaches the bump part from the lower-side part during a vehicle emergency. Therefore, when climbing the bump part, the webbing can give rotational force to the through-anchor via the second sliding surface before the first sliding surface. As a result, the through-anchor rotates early and, accordingly, jamming is more reliably prevented.

Preferably, a flat surface is included in a surface of the bump part from the foot part to each of the peak parts, and the flat surface is configured to be smoothly connected to the receding shape of the foot part and the protruding shape of the peak part. Accordingly, during a vehicle emergency, the webbing smoothly climbs the peak parts from the foot part of the bump part via the flat surface and reliably gives rotational force to the through-anchor in the course of reaching the peak parts of the bump part. As a result, jamming is prevented.

Preferably, the first sliding surface and the second sliding surface are connected to each other by a smoothly continuous surface. Accordingly, during a vehicle emergency, the webbing smoothly climbs the first sliding surface from the second sliding surface via the continuous surface and reliably gives rotational force to the through-anchor in the course of reaching the peak parts of the bump part. As a result, jamming is prevented.

Preferably, the bump part includes the first sliding surface between a ridge line formed by connecting the peak parts and the lateral edge. Therefore, even though the webbing separates from the lower edge of the insertion hole during a vehicle emergency, the webbing maintains surface contact with the bump part over a wide range while smoothly climbing the first sliding surface of the bump part that extends from the lateral edge to the ridge line. The webbing that smoothly climbs the first sliding surface configured as described above gives rotational force to the through-anchor via the first sliding surface and, as a result, the webbing can prevent jamming.

Preferably, the ridge line is formed along the shape of the lateral edge. Accordingly, during a vehicle emergency, the webbing can reliably secure surface contact with the bump part over a wide range while more smoothly climbing the first sliding surface of the bump part that extends from the lateral edge to the ridge line. Therefore, the webbing can reliably give rotational force to the through-anchor via the first sliding surface.

In order to solve the problems described above, another typical configuration of a seatbelt through-anchor according to the present invention is such that the seatbelt through-anchor is rotatably attached to a vehicle interior wall and is folded back after a band-shaped webbing extracted from a retractor is inserted through the seatbelt through-anchor, the seatbelt through-anchor including: an insertion hole through which the webbing is inserted, the insertion hole including an approximately linear lower edge which comes into contact with a surface of the webbing so as to traverse the webbing and on which the webbing slides, and a lateral edge extending in a curve from an end part of the lower edge; a lower-side part provided below the lower edge; and a bump part provided on a surface of the through-anchor so as to extend from a vicinity of an end of the lower-side part in a lateral direction of the through-anchor and protruding beyond a surface of the lower-side part in a direction corresponding to a vehicle interior side when the through-anchor is installed, wherein when the portion protruding from the lower-side part of the bump part is viewed in a cross section including the lower-side part, a foot part of the bump part has a shape that is outwardly receding from the through-anchor and a vicinity of each of peak parts of the bump part has a shape that is outwardly protruding from the through-anchor, and the bump part includes a second sliding surface configured such that the receding shape and the protruding shape are smoothly connected to each other.

According to the configuration described above, since the foot part and the peak parts of the bump part are smoothly connected to each other by the second sliding surface, the webbing smoothly climbs the second sliding surface and reaches the bump part from the lower-side part during a vehicle emergency. Therefore, when climbing the bump part, the webbing can give rotational force to the through-anchor via the second sliding surface. As a result, the through-anchor rotates early and, accordingly, jamming is more reliably prevented.

Preferably, a flat surface is included in a surface of the bump part from the foot part to each of the peak parts, and the flat surface is configured to be smoothly connected to the receding shape of the foot part and the protruding shape of the peak part. Accordingly, during a vehicle emergency, the webbing smoothly climbs the peak parts from the foot part of the bump part via the flat surface and reliably gives rotational force to the through-anchor in the course of reaching the peak parts of the bump part. As a result, jamming is prevented.

Preferably, the bump part is provided at least between a first straight line passing through the end part of the lower edge and extending in a shorter-side direction of the insertion hole and a second straight line passing through an endmost part at an outermost position of the lateral edge and extending in a longitudinal direction of the insertion hole. Accordingly, even in a situation where an impact upon vehicle collision is large and the webbing climbs the first sliding surface of the bump part which extends from the end part of the lower edge to the endmost part of the lateral edge, the webbing can still secure surface contact with the bump part. Therefore, according to the configuration described above, jamming can be prevented not only during a head-on collision of a vehicle but also during various emergencies of the vehicle including a side collision of the vehicle.

In order to solve the problems described earlier, a typical configuration of a seatbelt device according to the present invention includes the seatbelt through-anchor described above. Since jamming during a vehicle emergency can be prevented by including the through-anchor described above, performance of the seatbelt device is not impaired.

According to the present invention, a seatbelt through-anchor and a seatbelt device capable of preventing jamming during a vehicle emergency can be provided. In addition, a pull-out force of a webbing during normal use is reduced.

DESCRIPTION OF THE PREFERRED EMBODIMENTS

Figure 1:
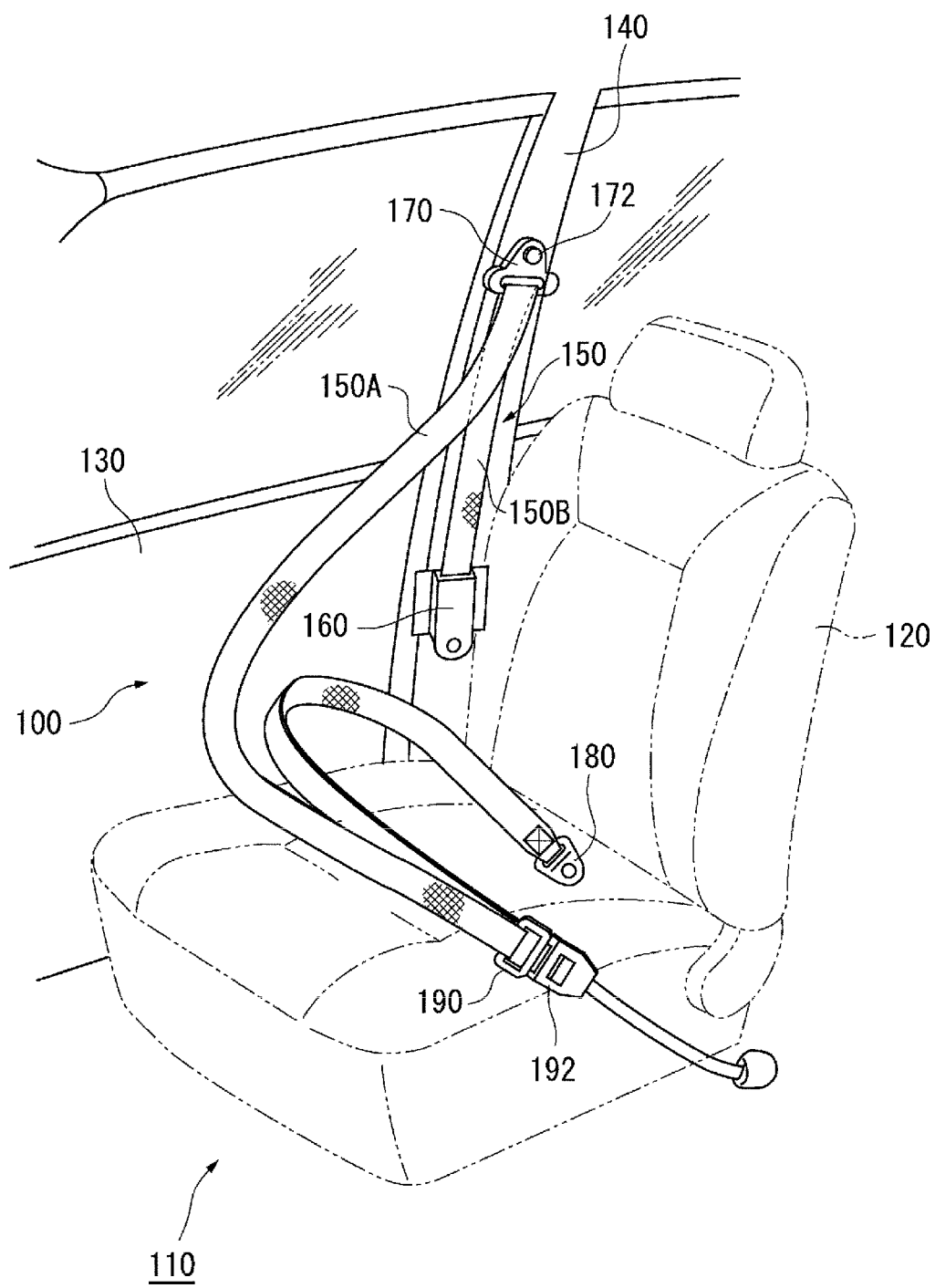
FIG. 1 is a diagram showing a part of a vehicle to which a seatbelt device according to an embodiment of the present invention is applied.

Hereinafter, preferred embodiments of the present invention will be described in detail with reference to the accompanying drawings. It is to be understood that dimensions, materials, other specific numerical values, and the like described in the embodiments merely represent examples for facilitating understanding of the invention and are not intended to limit the present invention unless otherwise noted. Moreover, elements having functions and configurations that are substantially the same in the present specification and the drawings are denoted by the same reference numerals to avoid redundancy. In addition, elements not directly related to the present invention will be omitted from the drawings.

FIG. 1 is a diagram showing a part of a vehicle 110 to which a seatbelt device 100 according to an embodiment of the present invention is applied. The drawing shows the seatbelt device 100 together with a vehicle seat 120 that is a right front seat inside the vehicle 110.

For example, the vehicle 110 includes the seatbelt device 100, the vehicle seat 120, a side door 130 positioned on a vehicle exterior side of the vehicle seat 120, and a center pillar 140. The center pillar 140 is a part of a vehicle interior wall part and is positioned on a vehicle rear side of the side door 130. The seatbelt device 100 is a safety device installed to the vehicle seat 120 and restrains an occupant to the vehicle seat 120 using a band-shaped webbing 150 for restraining an occupant.

The webbing 150 is wound up or pulled out by a retractor 160 positioned in a lower part inside the vehicle, passed through a seatbelt through-anchor (through-anchor 170), and folded back from a side of the center pillar 140 (wall side) toward a vehicle interior side. The through-anchor 170 is rotatably fixed to an upper part of the center pillar 140 by, for example, a bolt 172. Moreover, although not shown in the figure, the seatbelt device 100 includes a pretensioner that abruptly winds up the webbing 150 during a vehicle emergency and an energy absorbing mechanism used when abruptly pulling out the webbing 150.

As shown in the figure, due to the webbing 150 being folded back at the through-anchor 170, the webbing 150 is divided across the through-anchor 170 into a first webbing 150A and a second webbing 150B. The first webbing 150A is positioned on a vehicle interior side of the through-anchor 170 along a direction in which the webbing 150 is pulled out. The second webbing 150B is continuous with the first webbing 150A and is positioned on a side of the retractor 160 or, in other words, on a wall side.

An anchor plate 180 is sutured to an end part of the first webbing 150A. Moreover, while the anchor plate 180 is not fixed in the drawing, in reality, the anchor plate 180 is attached to a lower part of the vehicle body between the side door 130 and the vehicle seat 120 by a bolt or the like. In addition, a tongue plate 190 through which the first webbing 150A is inserted and which is capable of sliding on the first webbing 150A is provided between the through-anchor 170 and the anchor plate 180.

A worn state of the seatbelt device 100 is created as the occupant grasps the tongue plate 190 and inserts the tongue plate 190 into a buckle 192 attached to a center part of the vehicle, whereby the seatbelt device 100 restrains the occupant with the webbing 150.

Figure 2:
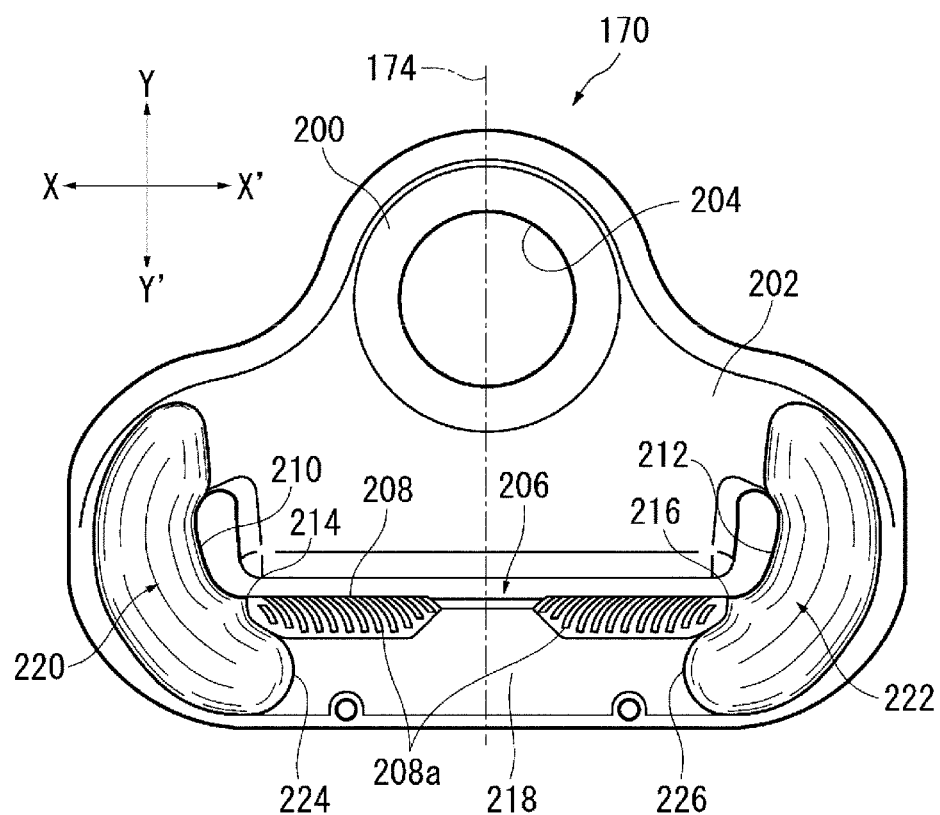
FIG. 2 is a diagram showing a through-anchor to be applied to the seatbelt device shown in FIG. 1.

FIG. 2 is a diagram showing an enlargement of the through-anchor 170 to be applied to the seatbelt device 100 shown in FIG. 1. The drawing shows a state of the through-anchor 170 as seen from the vehicle interior side. Moreover, arrows X and Y respectively indicate a vehicle front side and a vehicle upper side. In addition, a direction of arrows X-X' is shown as a front-rear (X direction represents front and X' direction represents rear) direction of the vehicle and as a lateral direction or a left-right (X direction represents left and X' direction represents right) direction of the through-anchor 170. Furthermore, a direction of arrows Y-Y' is shown as a longitudinal direction or an up-down (Y direction represents up and Y' direction represents down) direction of the through-anchor 170. A center line 174 is a line which connects a center of a bolt hole 204 and a center in a horizontal direction of an insertion hole 206 and which is parallel to the direction of arrows Y-Y'.

As shown in the figure, the through-anchor 170 includes an insert metal fitting 200 and a coated resin 202. For example, the coated resin 202 is molded onto and integrated with the insert metal fitting 200. The insert metal fitting 200 is a metal plate formed by punching or the like. The bolt hole 204 is formed in an upper part of the insert metal fitting 200. The through-anchor 170 is rotatably fixed to a vehicle interior wall by inserting the bolt 172 into the bolt hole 204.

The insertion hole 206 through which the webbing 150 is to be inserted is formed in a lower part of the insert metal fitting 200. The insertion hole 206 includes a lower edge 208 and lateral edges 210 and 212. The lower edge 208 is an approximately linear edge which comes into contact with a surface of the webbing 150 so as to traverse the webbing 150 and on which the webbing 150 slides. The lateral edges 210 and 212 are respectively continuous with the vicinity of end parts 214 and 216 of the lower edge 208 and, for example, extend upward in a curve.

Furthermore, the through-anchor 170 includes a lower-side part 218 and bump parts 220 and 222. The lower-side part 218 is a part of a main body of the through-anchor 170 provided below the lower edge 208. During normal use, the webbing 150 that is extracted from the retractor 160 comes into contact with the lower edge 208 and the lower-side part 218 and slides. Moreover, "during normal use" includes cases such as an occupant pulling out the webbing 150 in order to restrain himself/herself and the retractor 160 pulling out or winding up the webbing 150 at normal speed during driving and the like.

During normal use, as shown in the figure, a low friction member 208a is arranged at a portion where the webbing 150 slides. The low friction member 208a comes into contact with the webbing 150 during normal use and reduces friction force due to the contact to reduce a force (pull-out force) that is created when the webbing 150 is pulled out.

The bump parts 220 and 222 are respectively provided along the lateral edges 210 and 212 from ends 224 and 226 of the lower-side part 218. Moreover, as shown in the figure, the insertion hole 206, the lower-side part 218, and the bump parts 220 and 222 of the through-anchor 170 according to the present example are symmetrically structured in a front-rear direction of the vehicle. Therefore, the bump part 222 positioned on the vehicle rear side has a similar shape to the bump part 220 positioned on the vehicle front side.

Figure 3:
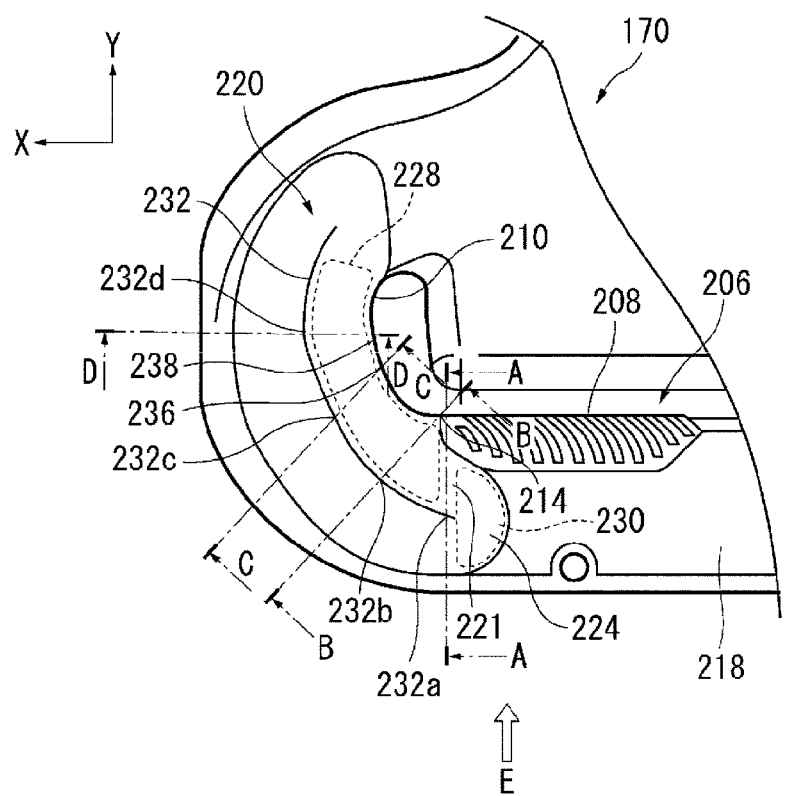
FIG. 3 is an enlarged view of a part of the through-anchor shown in FIG. 2.
Figure 3:
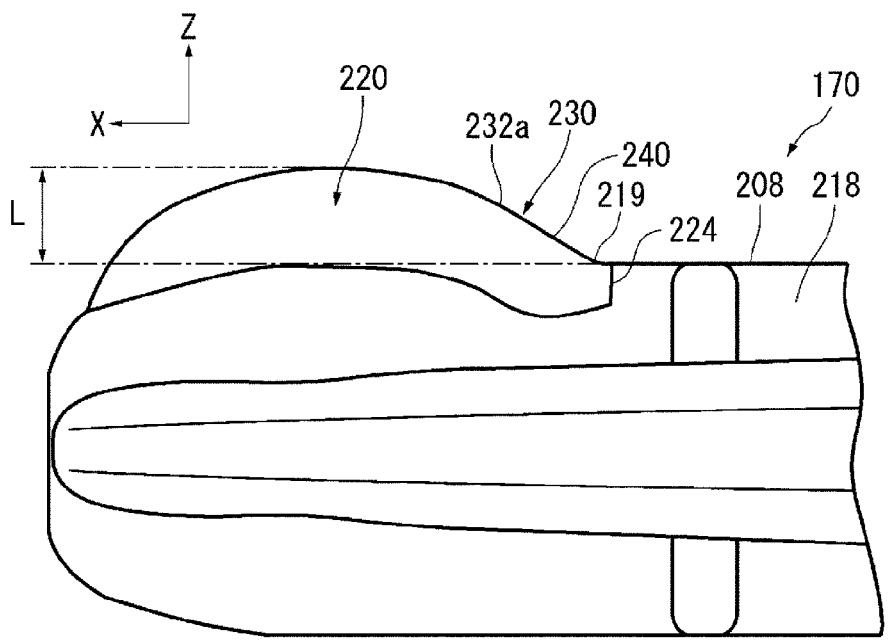
Figure 4:
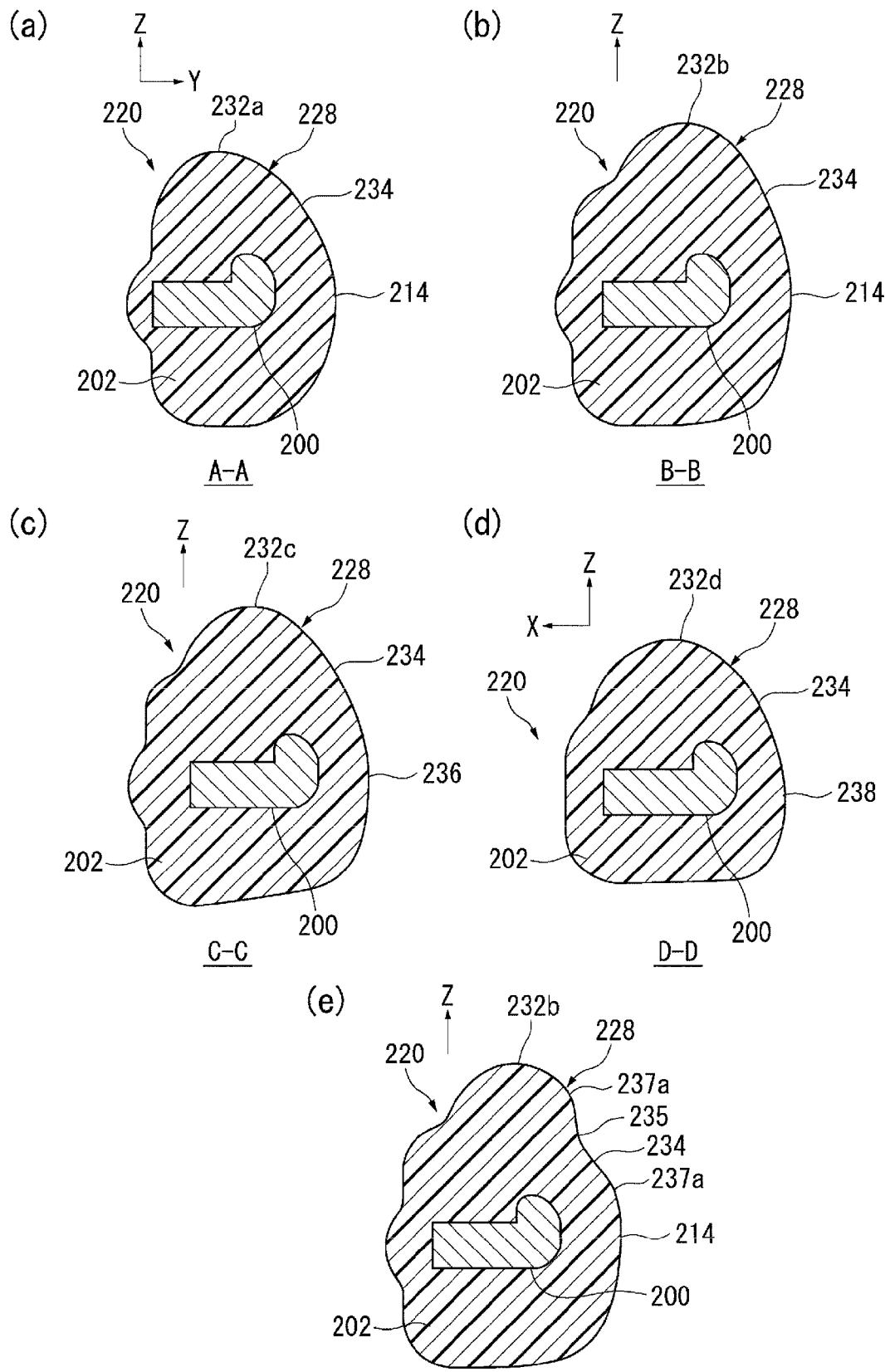
FIG. 4 is a diagram showing a cross section of the through-anchor shown in FIG. 3A.
Figure 6:
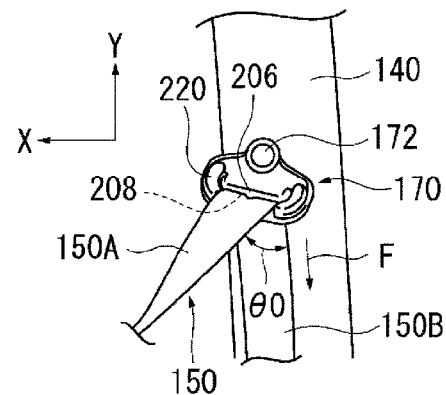
FIG. 6 is a diagram showing a state of the through-anchor shown in FIG. 2 during a vehicle emergency.
Figure 6:
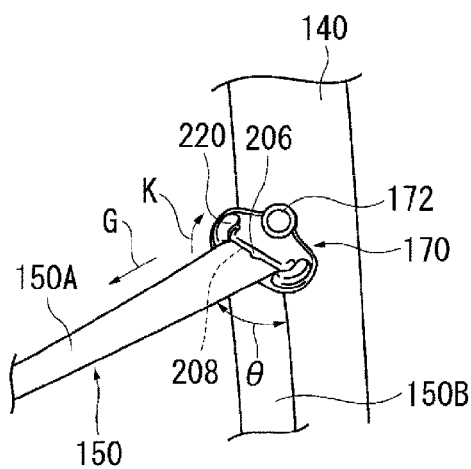
Figure 6:
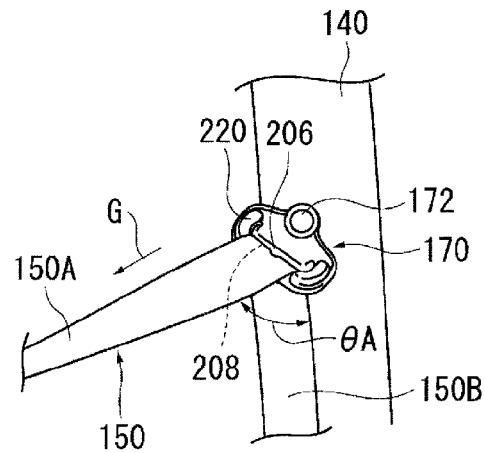

Hereinafter, the bump part 220 and a periphery thereof will be described with reference to FIGS. 3 and 4 as an embodiment of the present invention. FIG. 3 is an enlarged view of a part of the through-anchor 170 shown in FIG. 2. FIG. 3A is a front view showing a partial enlargement of the vehicle front side of the through-anchor 170 shown in FIG. 2. FIG. 3B is a diagram showing a state where a part of the through-anchor 170 shown in FIG. 3A is viewed from a direction indicated by an arrow E. The arrow E corresponds to a direction in which the bump part 220 protruding from the lower-side part 218 of the through-anchor 170 shown in FIG. 2 is viewed in a cross section including the lower-side part 218. In other words, the arrow E corresponds to a direction of viewing the through-anchor 170 along the first webbing 150A from a direction in which the first webbing 150A in a state shown in FIG. 6 is pulled out. Moreover, an arrow Z indicates a direction toward an interior side of the vehicle. FIG. 4 is a diagram showing a cross section of the through-anchor 170 shown in FIG. 3A.

The bump part 220 includes a first sliding surface 228 and a second sliding surface 230 which are shown enclosed by dotted lines in FIG. 3A. The first sliding surface 228 is formed between the lateral edge 210 and a ridge line 232 and includes a smooth curved surface 234 (refer to FIG. 4).

The ridge line 232 is formed by connecting locations protruding the furthest in the course of separating from the lateral edge 210 or, in this case, peak parts 232a, 232b, 232c, 232d, and the like. In other words, the ridge line 232 may be described as a line that is a succession of peak parts 232a, 232b, 232c, 232d, and the like, with each peak part being a single point on a summit of the bump part 220. In addition, as shown in FIG. 3A, the ridge line 232 is formed along a shape of the lateral edge 210.

The term "smooth" as used in the present invention refers to, for example, a flat surface or a curved surface that is an object having a finer surface roughness than a texture of the sliding webbing 150 from the perspective of surface roughness. In addition, from the perspective of shape, for example, a situation where a flat surface or a curved surface that is an object does not have any local projections or protrusions and a situation where an object portion is viewed by its cross section and no corners project from a surface thereof can be described to be "smooth". Furthermore, in addition to these situations, as exemplified in FIG. 13, even when a plurality of grooves 233a that are regularly arranged in a sliding direction of the webbing are formed on an object surface 233, when a surface portion 233b other than the grooves 233a is smooth, the object surface 233 can be considered "smooth" as used in the present invention.

As shown in FIG. 3B, the bump part 220 protrudes beyond a surface portion of the lower-side part 218 by a dimension L in a direction in which the webbing 150 is pulled out such as toward a vehicle interior side (Z direction). Moreover, the dimension L may be appropriately set in accordance with a size of the through-anchor 170.

The peak part 232a that is one point in a group on a summit of the bump part 220 is positioned on a line A-A shown in FIG. 3A. The line A-A is a straight line (first straight line) that passes through the end part 214 of the lower edge 208 and extends in a shorter-side direction of the insertion hole 206. On an A-A cross section shown in FIG. 4A, the bump part 220 includes a first sliding surface 228 between the end part 214 of the lower edge 208 and the peak part 232a. The first sliding surface 228 is configured to include a smooth curved surface 234 that outwardly protrudes from the through-anchor 170. Moreover, as shown in FIG. 4A, the first sliding surface 228 is most steep in a vicinity of the end part 214 of the lower edge 208.

A direction described as "outward from the through-anchor 170" in the present invention refers to a direction of increasing a thickness of the coated resin 202 as viewed from the insert metal fitting 200. Therefore, a direction described as "outward from the through-anchor 170" exists not only for up-down and left-right directions with respect to the through-anchor 170 but for any direction including a direction toward an interior side of the vehicle and a direction toward a vehicle exterior side.

The peak parts 232b and 232c that are points in a group on a summit of the bump part 220 are respectively positioned on lines B-B and C-C shown in FIG. 3A. The line B-B is a straight line which, for example, passes through the end part 214 of the lower edge 208 and extends in a direction that differs from that of the line A-A. The line C-C is a straight line which passes through a point 236 on the lateral edge 210 and which represents an upward parallel movement of the line B-B.

The bump part 220 includes the first sliding surface 228 configured to include a smooth curved surface 234 that outwardly protrudes from the through-anchor 170 between the end part 214 of the lower edge 208 and the peak part 232b and between a point 236 on the lateral edge 210 and the peak part 232c in a B-B cross section shown in FIG. 4B and a C-C cross section shown in FIG. 4C. Moreover, as shown in FIGS. 4B and 4C, the first sliding surface 228 is respectively most steep in a vicinity of the end part 214 of the lower edge 208 and at the point 236 on the lateral edge 210.

The peak part 232d that is one point in a group on a summit of the bump part 220 is positioned on a line D-D shown in FIG. 3A. The line D-D is a straight line (second straight line) which passes through a point (an endmost part 238) positioned furthest on a vehicle front side of the lateral edge 210 and which extends in a longitudinal direction of the insertion hole 206. In a D-D cross section shown in FIG. 4D, the bump part 220 includes the first sliding surface 228 configured to include a smooth curved surface 234 that outwardly protrudes from the through-anchor 170 between the endmost part 238 of the lateral edge 210 and the peak part 232d.

As described above, the bump part 220 is provided at least between the line A-A that is the first straight line and the line D-D that is the second straight line as shown in FIG. 3A. In addition, as shown in FIG. 4, the end part 214 of the lower edge 208, the point 236 of the lateral edge 210, and the endmost part 238 correspond to a base of the bump part 220 in the insertion hole 206.

While the first sliding surface 228 is configured to include a protruding smooth curved surface 234 as shown in FIGS. 4A to 4D, the first sliding surface 228 is not limited to this configuration and may include a flat surface. In addition, as long as a protruding shape of the curved surface 234 is maintained as a whole, a shape in which a portion 235 of the curved surface 234 is slightly receding is permissible such as the cross-sectional shape shown in FIG. 4E that corresponds to FIG. 4B. In this case, portions 237a and 237b with protruding shapes are provided around a receding portion 235.

The second sliding surface 230 continues from a vicinity of the end 224 of the lower-side part 218 to the peak part 232a at the end of the ridge line 232 as illustrated in FIG. 3A. When viewed from an arrow E shown in FIG. 3A, in the second sliding surface 230, a vicinity of the end 224 of the lower-side part 218 or, in other words, a foot part 219 on a surface of the lower-side part 218 of the bump part 220 has a shape that recedes outward from the through-anchor 170 as illustrated in FIG. 3B. In addition, a vicinity of the peak part 232a has a shape that protrudes outward from the through-anchor 170. Furthermore, the receding shape and the protruding shape are configured to be smoothly continuous with each other.

As shown in FIG. 3B, the second sliding surface 230 has a curved surface 240 that smoothly connects the end 224 of the surface of the lower-side part 218 with the bump part 220. However, in place of the curved surface 240, the second sliding surface 230 may include a protruding surface, a receding surface, or a flat surface as long as the lower-side part 218 and the bump part 220 are smoothly connected to each other. Furthermore, the first sliding surface 228 and the second sliding surface 230 are connected to each other by a smoothly continuous surface 221 as shown in FIG. 3A.

Figure 5:
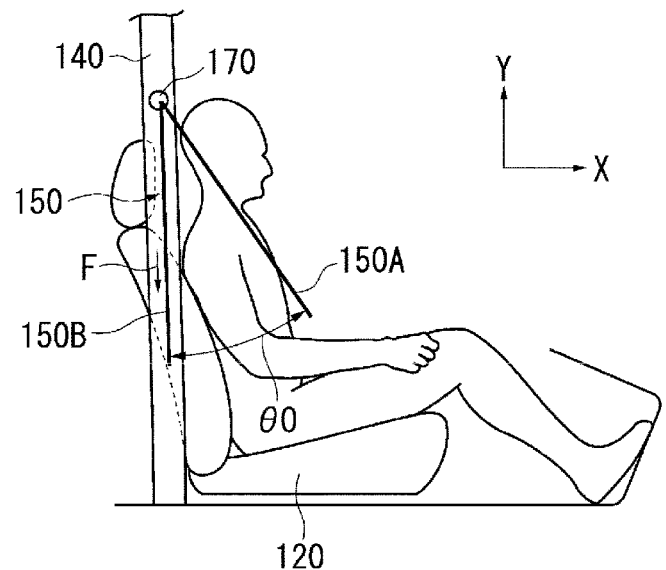
FIG. 5 is a diagram showing a change in a webbing opening angle during a vehicle emergency.
Figure 5:
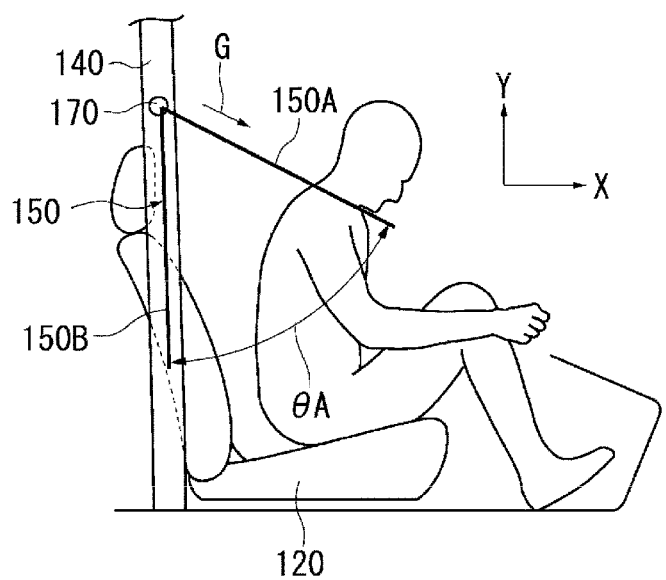

Next, behaviors of the webbing 150 and the through-anchor 170 during an emergency such as a vehicle collision will be described with reference to FIGS. 5 to 7. FIG. 5 is a diagram showing a change in a webbing opening angle during a vehicle emergency. A webbing opening angle refers to an angle formed between the first webbing 150A and the second webbing 150B when the through-anchor 170 is viewed from the vehicle interior side or the vehicle side surface side.

FIG. 5 schematically shows an occupant being seated on the vehicle seat 120 and having a vicinity of a shoulder portion restrained by the first webbing 150A. The vehicle seat 120 is capable of sliding in front and rear directions of the vehicle. The drawing shows the vehicle seat 120 in a state (R/M; RearMost) where the vehicle seat 120 has been slid to a rearmost side of the vehicle. In this state, for example, the vicinity of the shoulder portion of the occupant is at a position near the center pillar 140 and a webbing opening angle θ0 shown in FIG. 5A is about 30°.

During a vehicle emergency, first, a pretensioner (not shown) operates in a direction indicated by an arrow F in FIG. 5A and the second webbing 150B is temporarily pulled inward to create a slackless state. Next, as shown in FIG. 5B, as an occupant moves forward, the first webbing 150A is abruptly pulled out in a direction indicated by an arrow G in accordance with the movement while energy is absorbed by an energy absorbing mechanism. At this point, the webbing opening angle θA shown in FIG. 5B is, for example, about 60° which is larger than the webbing opening angle θ0 described above.

In other words, during a vehicle emergency, an occupant moves to the front of the vehicle due to inertia, and the first webbing 150A having restrained a vicinity of a shoulder part of the occupant up until then exhibits a behavior approaching a more horizontal state while being abruptly pulled out. Therefore, the webbing opening angle changes to become larger.

However, when the webbing opening angle increases and the first webbing 150A approaches a horizontal state, the first webbing 150A does not simply follow a vehicle interior wall such as the center pillar 140. For example, when the first webbing 150A during a vehicle emergency is viewed from above, an angle formed between the first webbing 150A and a wall (such as the center pillar or a door) may also increase. The behavior of the through-anchor 170 in such a case will be described with reference to FIG. 6.

FIG. 6 is a diagram showing a state of the through-anchor 170 shown in FIG. 2 during a vehicle emergency. FIGS. 6A and 6C respectively show states corresponding to FIGS. 5A and 5B and are expressed by webbing opening angles θ0 and θA. FIG. 6B shows a state midway between the state shown in FIG. 6A and the state shown in FIG. 6C and is expressed by a webbing opening angle θ.

Figure 7:
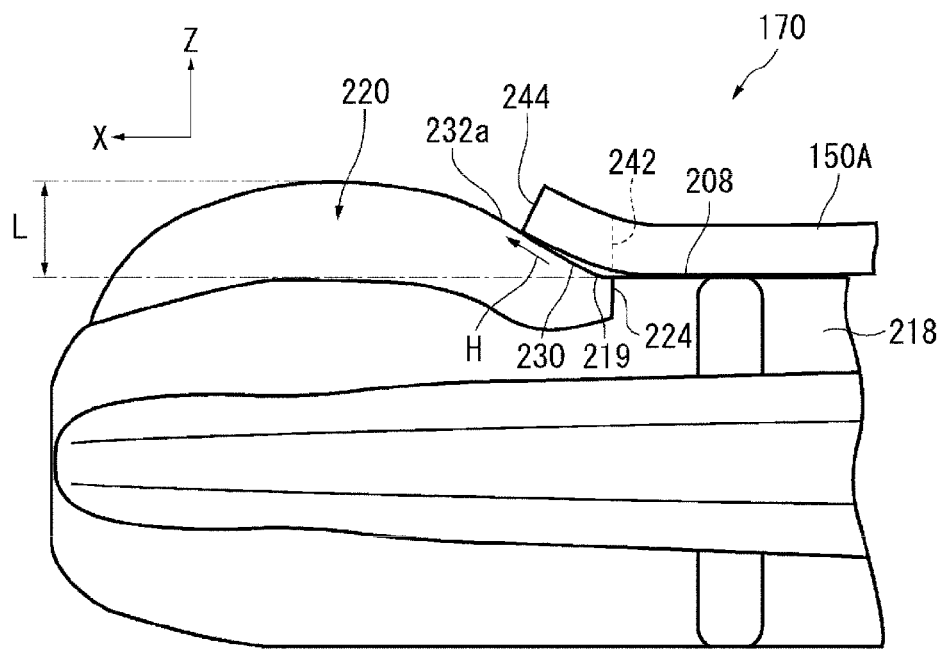
FIG. 7 is an enlarged view of a part of the through-anchor shown in FIG. 6.
Figure 7:
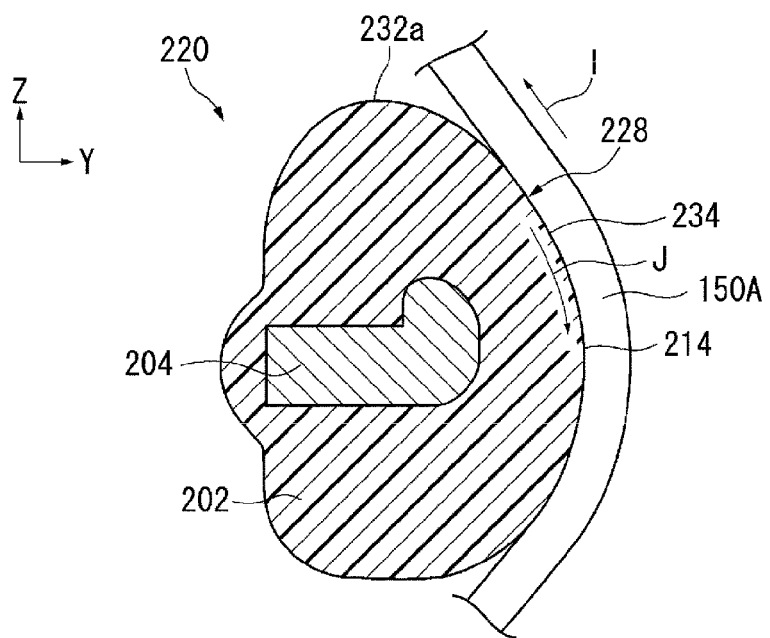

FIG. 7 is an enlarged view of a part of the through-anchor 170 shown in FIG. 6. FIG. 7A shows states of the first webbing 150A and the through-anchor 170 in a state shown in FIG. 6B as viewed along the first webbing 150A from a direction in which the first webbing 150A is pulled out. FIG. 7B is a diagram showing states of the first webbing 150A and the through-anchor 170 following FIG. 7A together with the A-A cross section shown in FIG. 4A.

During a vehicle emergency, first, the slack of the second webbing 150B is removed as indicated by an arrow F in FIG. 6A to create a state where the webbing opening angle θ0 is formed. At this point, the first webbing 150A slides while coming into contact with the lower edge 208 of the insertion hole 206 of the through-anchor 170.

Subsequently, as an occupant moves to the vehicle front side due to inertia, the first webbing 150A exhibits a behavior in which the first webbing 150A approaches a more horizontal state, the webbing opening angle becomes larger, and an angle formed with the wall including the center pillar 140 also becomes larger as described above.

At this point, as shown in FIG. 7A, while separating from the lower edge 208 of the insertion hole 206 with which the first webbing 150A has been in contact until then, the first webbing 150A starts to smoothly climb the second sliding surface 230 which smoothly connects the lower-side part 218 and the bump part 220 to each other and which ranges from the end 224 of the lower-side part 218 to the peak part 232a from the foot part 219 as indicated by an arrow H. Moreover, in FIG. 7A, a side end part 242 before movement of the first webbing 150A is indicated by a dotted line and a side end part 244 after movement of the first webbing 150A is indicated by a solid line.

By climbing the second sliding surface 230, the first webbing 150A reaches the bump part 220 from a surface of the lower-side part 218. In addition to simply coming into surface contact with the bump part 220, the first webbing 150A can slide with respect to the bump part 220 and smoothly climb the second sliding surface 230. When climbing the bump part 220, the first webbing 150A engages in a behavior in which the first webbing 150A separates from the lower edge 208 and reduces a contact area with the lower edge 208 while increasing a contact area with the second sliding surface 230 of the bump part 220 as illustrated in FIG. 7A. As a result, the first webbing 150A is capable of maintaining surface contact with the second sliding surface 230 over a wide range even during a vehicle emergency.

The first webbing 150A that smoothly climbs the second sliding surface 230 while maintaining surface contact with the bump part 220 over a wide range appropriately restricts movement (rotation) of the through-anchor 170 with a friction force (in opposite direction to H) and the like created by the surface contact.

As shown in FIG. 7B, the first webbing 150A moves to the end part 214 of the lower edge 208 and attempts to move so as to cover (climb) the bump part 220 provided along the lateral edge 210 extending from the end part 214 of the lower edge 208 while coming into contact with the lateral edge 210.

At this point, as shown in FIG. 7B, the bump part 220 protrudes in a direction indicated by an arrow I in which the first webbing 150A is pulled out. Furthermore, the bump part 220 includes the first sliding surface 228 formed between the end part 214 of the lower edge 208 and the peak part 232a of the ridge line 232.

The first sliding surface 228 includes the smooth curved surface 234 with a protruding shape as described earlier. Therefore, in addition to simply coming into surface contact with the bump part 220, the first webbing 150A can slide with respect to the bump part 220 and smoothly climb the first sliding surface 228. Therefore, when climbing the bump part 220, the first webbing 150A engages in a behavior in which the first webbing 150A separates from the lower edge 208 and reduces a contact area with the lower edge 208 (refer to FIG. 7A) while increasing a contact area with the first sliding surface 228 of the bump part 220 as illustrated in FIG. 7B. As a result, the first webbing 150A is capable of maintaining surface contact with the first sliding surface 228 over a wide range even during a vehicle emergency.

The first webbing 150A that smoothly climbs the first sliding surface 228 while maintaining surface contact with the bump part 220 over a wide range appropriately restricts movement (rotation) of the through-anchor 170 with a friction force J and the like created by the surface contact.

In a situation where the occupant is moving forward such as during a vehicle emergency, the first webbing 150A itself is still pulled forward and is attempting to approach a horizontal state. Therefore, the first webbing 150A can give a force that causes rotation (hereinafter, rotational force) to the through-anchor 170 via the first sliding surface 228 and the second sliding surface 230 of the bump part 220 with which the first webbing 150A is in surface contact. Due to the action of the rotational force and the like, the first webbing 150A is prevented from excessively climbing the first sliding surface 228 of the bump part 220.

As a result, the through-anchor 170 rotates as indicated by an arrow K shown in FIG. 6B. Therefore, as shown in FIG. 6C, the first webbing 150A enters a state where the first webbing 150A comes into contact with the lower edge 208 of the insertion hole 206 of the through-anchor 170 at a webbing opening angle θA and is not moved to one side of the insertion hole 206. Therefore, according to the through-anchor 170, jamming can be prevented.

Figure 8:
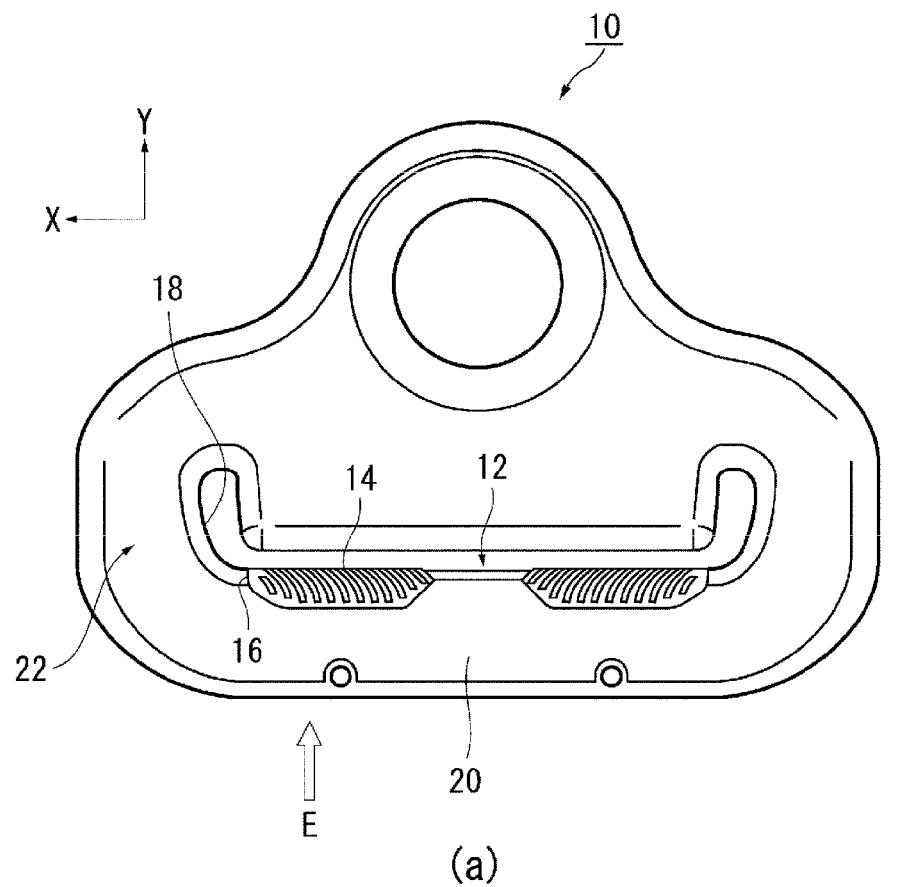
FIG. 8 is an enlarged view of a through-anchor according to a comparative example.
Figure 8:
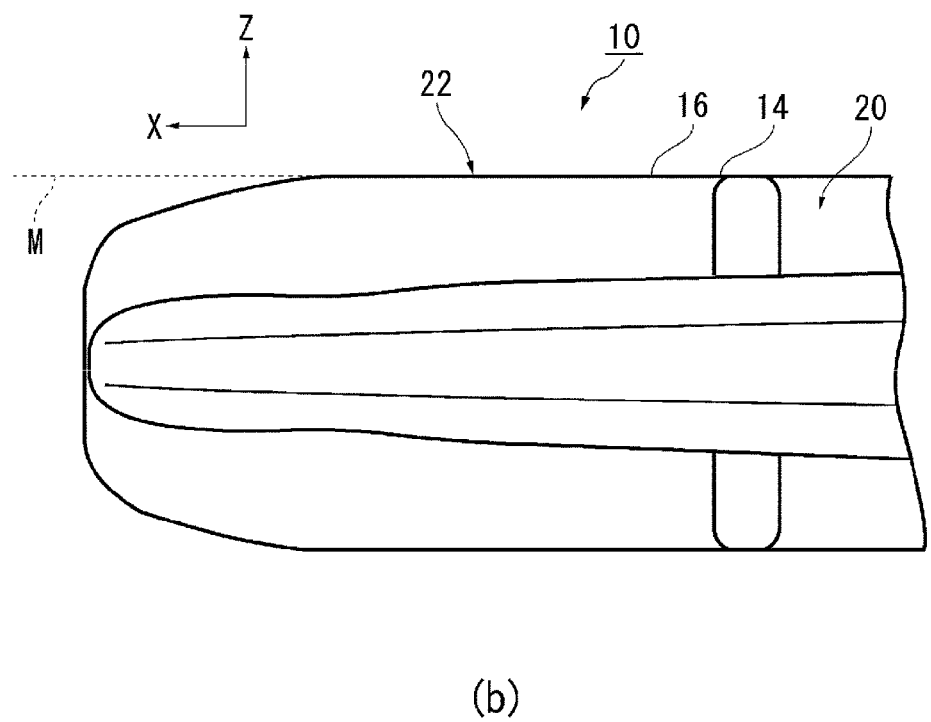

FIG. 8 is an enlarged view of a through-anchor 10 according to a comparative example. FIG. 8A is a front view of the through-anchor 10 as viewed from a vehicle interior side. FIG. 8B is a diagram showing a state where a part of the through-anchor 10 shown in FIG. 8A is viewed from a direction indicated by an arrow E.

The through-anchor 10 differs from the through-anchor 170 according to the present embodiment in that the bump part 220 described above is not formed. As shown in FIG. 8A, an insertion hole 12 of the through-anchor 10 includes an approximately linear lower edge 14 and a lateral edge 18 continuing from an end part 16 of the lower edge 14 and extending upward in a curve. The through-anchor 10 further includes a lower-side part 20 provided below the lower edge 14 and a flat surface part 22 formed along the lateral edge 20. As indicated by a dotted line M in FIG. 8B, the flat surface part 22 has an approximately same height as a surface of the lower-side part 20 and does not protrude toward the vehicle interior side as is the case of the bump part 220 described earlier.

Figure 9:
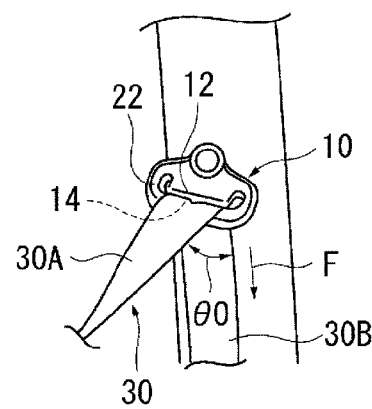
FIG. 9 is a diagram showing a state of the through-anchor shown in FIG. 8 during a vehicle emergency.
Figure 9:
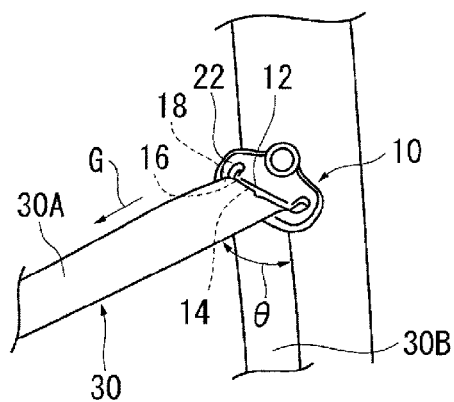
Figure 9:
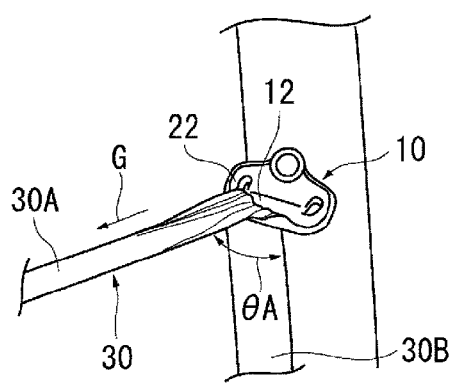

Hereinafter, behavior of the through-anchor 10 and a webbing 30 during a vehicle emergency will be described with reference to FIG. 9. FIG. 9 is a diagram showing a state of the through-anchor 10 shown in FIG. 8 during a vehicle emergency.

During a vehicle emergency, first, a pretensioner (not shown) operates as indicated by an arrow F in FIG. 9A and a second webbing 30B is temporarily pulled inward to create a slackless state. Moreover, the webbing opening angle is θ0 in a similar manner to FIG. 6A.

Subsequently, as an occupant moves forward, a first webbing 30A is abruptly pulled out by an energy absorbing mechanism as indicated by an arrow G in FIG. 9B. At this point, the webbing opening angle is θ that is larger than the webbing opening angle θ0.

In addition, the first webbing 30A exhibits a behavior of approaching a more horizontal state while being abruptly pulled out, and moves to an end part 16 of the lower edge 14 of the insertion hole 12 while separating from the lower edge 14 with which the first webbing 30A had been in contact up until then.

Furthermore, as shown in FIG. 9B, the first webbing 30A moves so as to climb the lateral edge 18 that continues from the end part 16 of the lower edge 14 while coming into contact with the lateral edge 18. However, in the through-anchor 10, the flat surface part 22 formed along the lateral edge 18 does not protrude toward the vehicle interior side. Therefore, the first webbing 30A is unable to maintain surface contact with the flat surface part 22 over a wide range and excessively climbs the flat surface part 22.

Moreover, although the first webbing 30A is unable to maintain surface contact with the flat surface part 22, it is assumed that the first webbing 30A is capable of maintaining point contact or line contact. Therefore, the first webbing 30A can conceivably give rotational force to the through-anchor 10 due to a small friction force created by the point contact or the line contact.

However, since the first webbing 30A itself is still being pulled forward and attempting to approach a horizontal state, the first webbing 30A continues to climb the flat surface part 22 at a faster pace than the rotation of the through-anchor 10. In other words, a situation arises where the rotation of the through-anchor 10 cannot catch up with the movement of the first webbing 30A.

As a result, with the through-anchor 10 according to the comparative example, as shown in FIG. 9C, a force of movement of the first webbing becomes stronger than a force causing the through-anchor 10 to rotate in a state where the webbing opening angle is θA. Subsequently, at the moment a balance between these forces is disrupted, the first webbing 30A moves to one side of the insertion hole 12 and jamming occurs.

In contrast, with the through-anchor 170 according to the present embodiment, the bump part 220 that protrudes beyond the lower-side part 218 includes the first sliding surface 228 including a smooth curved surface 234 having a protruding shape and the second sliding surface 230 that is connected to the first sliding surface 228 by a smoothly continuous surface 221 (refer to FIG. 3A). Therefore, according to the through-anchor 170, even though the first webbing 150A separates from the lower edge 208 of the insertion hole 206 during a vehicle emergency, the first webbing 150A can secure surface contact with the bump part 220 over a wide range while smoothly climbing the first sliding surface 228 and the second sliding surface 230 of the bump part 220. In addition, since the first webbing 150A is still being pulled forward and attempting to approach a horizontal state, the first webbing 150A can give sufficient rotational force to the through-anchor 170 via the first sliding surface 228 and the second sliding surface 230 of the bump part 220 with which the first webbing 150A is in surface contact. As a result, since the through-anchor 170 reliably rotates, jamming can be prevented.

In addition, the bump part 220 is formed so as to protrude toward the vehicle interior side and no weak portions are created. Therefore, even when the bump part 220 is subjected to a load that is large enough to cause twist deformation of a torsion bar inside the retractor 160 during a vehicle emergency, the bump part 220 does not deform. In addition, because the through-anchor 170 rotates, the load itself is not locally applied to the bump part 220.

Furthermore, as shown in FIG. 3A, the bump part 220 is provided at least between the line A-A that is the first straight line passing through the end part 214 of the lower edge 208 and the line D-D that is the second straight line passing through the endmost part 238 of the lateral edge 210. Therefore, even when an unanticipated situation occurs where an impact of a vehicle collision is large enough to cause the first webbing 150A to climb to the top of the first sliding surface 228 of the bump part 220 which ranges from the end part 214 of the lower edge 208 to the endmost part 238 of the lateral edge 210, the first webbing 150A can maintain surface contact with the bump part 220. As a result, jamming can be prevented not only during a head-on collision of a vehicle but also during various emergencies of the vehicle including a side collision of the vehicle.

In addition, since the lower-side part 218 and the bump part 220 are smoothly connected to each other by the second sliding surface 230, during a vehicle emergency, the first webbing 150A smoothly climbs the second sliding surface 230 and reaches the bump part 220 from the lower-side part 218. Therefore, when climbing the bump part 220, the first webbing 150A can give rotational force to the through-anchor 170 via the second sliding surface 230 before the first sliding surface 228. As a result, the through-anchor 170 rotates early and, accordingly, jamming is more reliably prevented.

Furthermore, in the embodiment described above, the bump part 220 protruding toward the vehicle interior side must maintain surface contact with the first webbing 150A during a vehicle emergency. Therefore, as a shape of the bump part 220, a shape that does not cause the first webbing 150A to climb during a vehicle emergency even when the shape protrudes toward the vehicle interior side and a shape that does not enable surface contact to be maintained even when the first webbing 150A climbs cannot prevent jamming and are not included in the present embodiment.

Moreover, if the bump part 220 protruding toward the vehicle interior side is capable of maintaining surface contact with the first webbing 150A during a vehicle emergency, the bump part 220 may be constituted by a smooth surface including at least one of a protruding surface, a receding surface, and a flat surface. In this case, during a vehicle emergency, the first webbing 150A can smoothly climb the bump part 220 and, at the same time, give rotational force to the through-anchor 170 via the bump part 220 using friction force created by the climbing. As a result, jamming can be prevented.

In addition, at the bump part 220, the ridge line 232 is formed along the shape of the lateral edge 210. Therefore, during a vehicle emergency, the first webbing 150A can reliably secure surface contact with the bump part 220 over a wide range while more smoothly climbing the first sliding surface 228 of the bump part 220 that extends from the lateral edge 210 to the ridge line 232. Therefore, the first webbing 150A can reliably give rotational force to the through-anchor 170 via the first sliding surface 228.

Regarding the bump part 220, as long as the first webbing 150A can secure surface contact with the bump part 220 while climbing the first sliding surface 228 during a vehicle emergency, the ridge line 232 need not necessarily be formed along the shape of the lateral edge 210.

Figure 10:
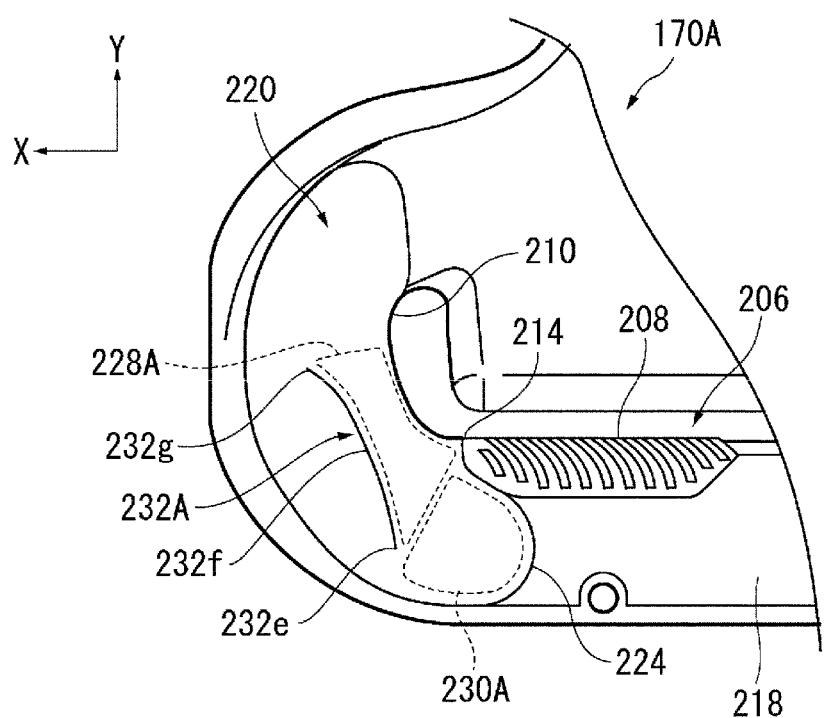
FIG. 10 is an enlarged view of a part of a through-anchor according to a modification.

FIG. 10 is an enlarged view of a part of a through-anchor 170A according to a modification. The through-anchor 170A differs from the through-anchor 170 shown in FIG. 3A in that a ridge line 232A is not formed along the shape of the lateral edge 210. In other words, the ridge line 232A curves so as to approach the lateral edge 210 from a peak part 232e to a peak part 232f and to separate from the lateral edge 210 from the peak part 232f to a peak part 232g. Even with such a through-anchor 170A, a first sliding surface 228A is formed between the lateral edge 210 and the ridge line 232A and a second sliding surface 230A is formed between the end 224 of the lower-side part 218 to the peak part 232e.

Therefore, according to the through-anchor 170A, during a vehicle emergency, the first webbing 150A climbs the first sliding surface 228A and the second sliding surface 230A and, at the same time, reliably gives rotational force to the through-anchor 170 via the first sliding surface 228A and the second sliding surface 230A. As a result, jamming can be prevented.

According to another embodiment of the present invention, as long as the bump part 220 is within a range where the first webbing 150A can climb the first sliding surface 228 and the second sliding surface 230 of the bump part 220 and, at the same time, maintain surface contact with the bump part 220 as shown in FIGS. 3 and 4 when the webbing opening angle increases during a vehicle emergency, the bump part 220 need not necessarily be provided between the line A-A and the line D-D shown in FIG. 3. For example, a configuration may be adopted where, when a portion of the bump part 220 that protrudes from the lower-side part 218 is viewed in a cross section including the lower-side part 218, the foot part 219 of the bump part 220 has a shape that recedes outward from the through-anchor 170, a vicinity of the peak part 232a of the bump part 220 has a shape that protrudes outward from the through-anchor 170, and the protruding shape and the receding shape are smoothly connected to each other. As an example thereof, the bump part 220 may only protrude in a vicinity of the end part 214 of the lower edge 208 shown in the A-A cross section in FIG. 4A and may not protrude toward the vehicle interior side in the cross sections shown in FIGS. 4B to 4D. In addition, other examples are shown in FIGS. 11 and 12.

Figure 11:
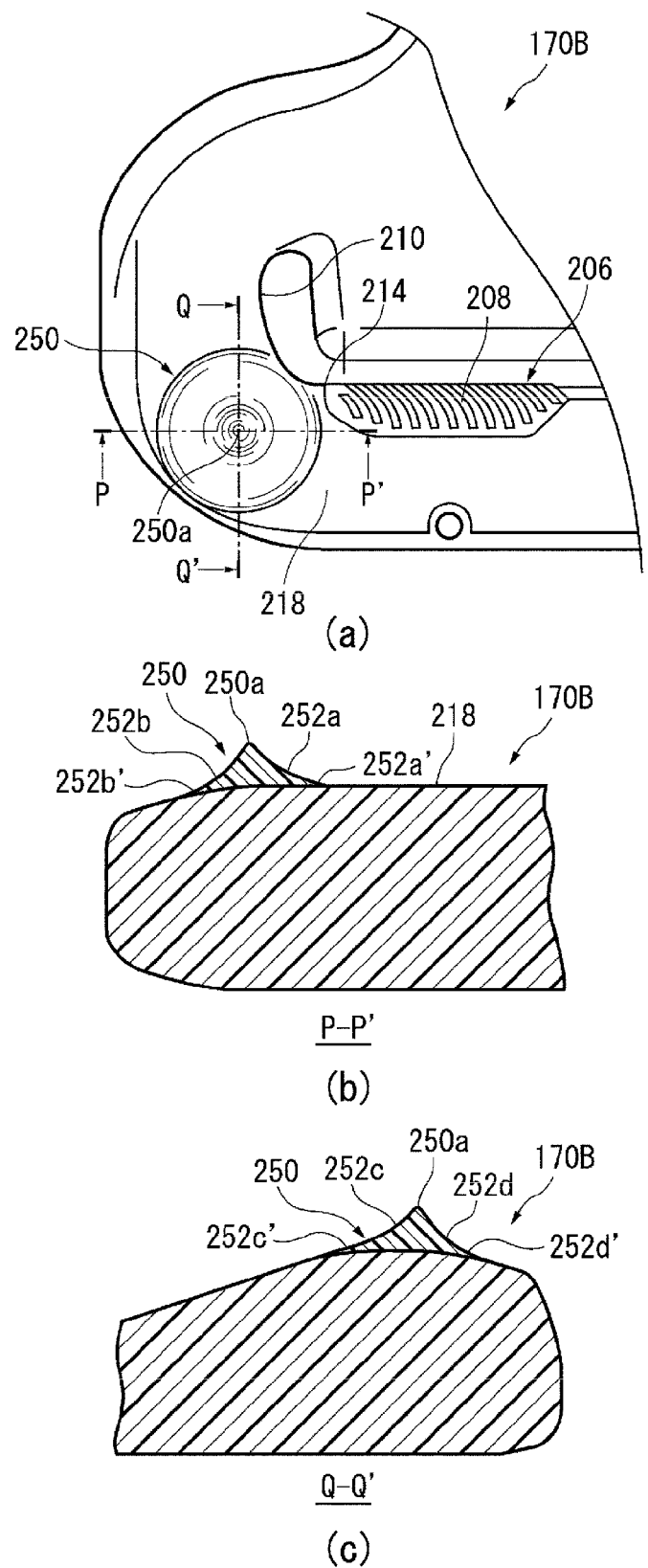
FIG. 11 is a diagram showing a through-anchor according to another embodiment of the present invention.
Figure 12:
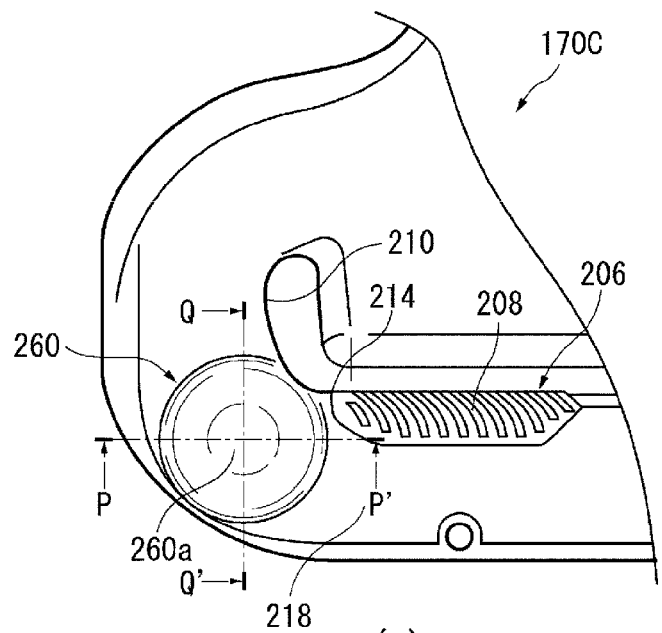
FIG. 12 is a diagram showing a modification of the through-anchor shown in FIG. 11.
Figure 12:
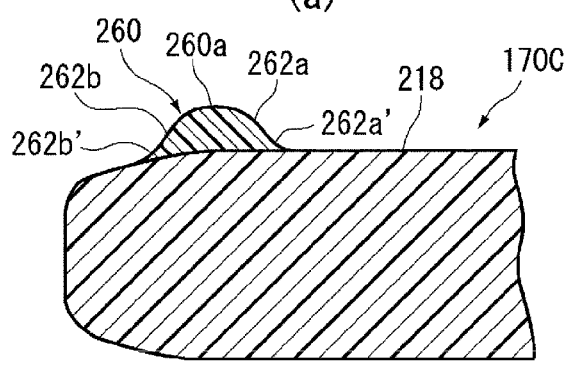
Figure 12:
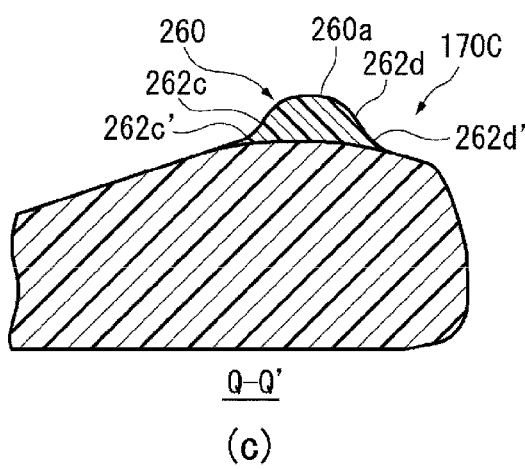

FIG. 11 is a diagram showing a through-anchor 170B according to another embodiment of the present invention. FIG. 11A is an enlarged view of a part of the through-anchor 170B. FIGS. 11B and 11C are diagrams respectively showing a P-P' cross section and a Q-Q' cross section shown in FIG. 11A.

As shown in the figure, the through-anchor 170B includes a bump part 250 that only includes a single peak part 250a that resembles an independent mountain. Therefore, the ridge line 232 is not formed on the bump part 250. However, as shown in the cross-sectional shapes shown in FIGS. 11B and 11C, the bump part 250 includes foot parts 252a', 252b', 252c', and 252d' having shapes receding outward from the through-anchor 170B that is smoothly continuous from the lower-side part 218 to the peak part 250a, and curved surfaces 252a, 252b, 252c, and 252d.

Therefore, with the through-anchor 170B, during a vehicle emergency, the first webbing 150A smoothly climbs any of the curved surfaces 252a, 252b, 252c, and 252d that form at least a part of the bump part 250 and, at the same time, gives rotational force via the bump part 250 using friction force created by the climbing. As a result, according to the through-anchor 170B, jamming can be prevented.

FIG. 12 is a diagram showing a modification of the through-anchor 170B shown in FIG. 11. FIG. 12A is an enlarged view of a part of a through-anchor 170C. FIGS. 12B and 12C are diagrams respectively showing a P-P' cross section and a Q-Q' cross section shown in FIG. 12A.

As shown in the figure, the through-anchor 170C includes a bump part 260 formed like an independent hilly portion. The bump part 260 including the hilly portion does not have an apparent summit like the peak part 250a nor an apparent ridge line 232. However, the bump part 260 has a shape resembling an entirely protruding hill and includes an approximately flat peak portion and a portion 260a that can be described as a ridge line. Therefore, as shown in the cross-sectional shapes shown in FIGS. 12B and 12C, the bump part 260 includes foot parts 262a', 262b', 262c', and 262d' having shapes receding outward from the through-anchor 170C that is smoothly continuous from the lower-side part 218 to the portion 260a, and curved surfaces 262a, 262b, 262c, and 262d.

Therefore, with the through-anchor 170C, during a vehicle emergency, the first webbing 150A smoothly climbs any of the curved surfaces 262a, 262b, 262c, and 262d that are arranged before the portion 260a of the bump part 260 and, at the same time, gives rotational force via the bump part 260 using friction force created by the climbing. Therefore, according to the through-anchor 170C, jamming can be prevented.

Figure 13:
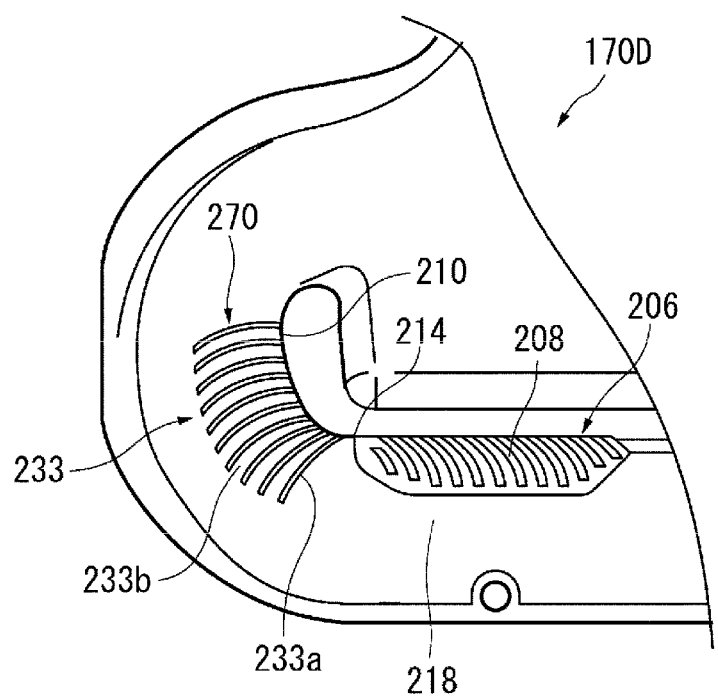
FIG. 13 is a diagram showing a through-anchor according to yet another modification.

FIG. 13 is a diagram showing a through-anchor 170D according to yet another modification. As described earlier, the through-anchor 170D includes a smooth surface 233 including grooves 233a formed so as to be regularly arranged in a sliding direction of the webbing and a surface portion 233b other than the grooves 233a. The smooth surface 233 constitutes a bump part 270 that protrudes beyond a surface portion of the lower-side part 218 toward the vehicle interior side.

As described above, since the through-anchor 170D includes the smooth surface 233 even when a plurality of grooves 233a are formed on the bump part 270, the first webbing 150A smoothly climbs the surface 233 and, at the same time, gives rotational force via the bump part 270 using friction force created by the sliding during a vehicle emergency. Therefore, according to the through-anchor 170D, jamming can be prevented.

While the second sliding surfaces 230 and 230A are provided in addition to the first sliding surfaces 228 and 228A in the embodiments described above, the present invention is not limited thereto. For example, as long as the first webbing 150A can secure surface contact with the bump part 220 while climbing the second sliding surfaces 230 and 230A to prevent jamming during a vehicle emergency, the first sliding surfaces 228 and 228A need not be formed. In a similar manner, as long as the first webbing 150A can secure surface contact with the bump part 220 while climbing the first sliding surfaces 228 and 228A to prevent jamming during a vehicle emergency, the second sliding surfaces 230 and 230A need not be formed.

Furthermore, while the prevention of jamming in accordance with the behavior of the through-anchor 170 when the vehicle seat 120 is in a so-called R/M state as shown in FIG. 5 and a change in webbing opening angles is somewhat large has been explained in the embodiments described above, the present invention is not limited thereto. In other words, even when the vehicle seat 120 is in a state (F/M; FrontMost) where the vehicle seat 120 has been slid to a frontmost side of the vehicle and the change in webbing opening angles is small, as long as the first webbing 150A can secure surface contact with the bump part 220 while climbing the bump part 220, jamming can be prevented.

On the other hand, it has been found that pull-out force of the webbing 150 during normal use is reduced when using, for example, the through-anchor 170 according to the present invention as compared to using a conventional through-anchor. Since the through-anchor 170 is easily given rotational force by the bump part 220, the through-anchor 170 can be more easily rotated when pulling out the webbing 150 during normal use. Therefore, the through-anchor 170 rotates every time the webbing 150 is pulled out and the pull-out angle of the webbing 150 is likely to be an optimum angle with respect to the through-anchor 170. Moreover, an optimum angle refers to an angle in a range where the webbing 150 can come into contact with the lower edge 208 of the insertion hole 206 of the through-anchor 170 and slide when the webbing 150 is pulled out during normal use.

With a conventional through-anchor not provided with the bump part 220, insufficient rotation of the through-anchor when the webbing is being pulled out causes the through-anchor itself to act as resistance with respect to the webbing being pulled out. With a conventional through-anchor, it is difficult to rotate the through-anchor to follow the pull-out angle of the webbing. Therefore, with a conventional through-anchor, providing the low friction member 208a (refer to FIG. 2) described above to a sliding portion of the webbing does not guarantee that the webbing will always slide on the low friction member 208a. As a result, reduction in pull-out force is insufficient.

In contrast, with the through-anchor 170 according to the present invention, the rotational force given by the bump part 220 enables the through-anchor 170 to rotate with the pulling out of the webbing 150 during normal use. Therefore, the through-anchor 170 is less likely to constitute a resistance with respect to the webbing 150 being pulled out. Furthermore, since the webbing 150 can always slide on the low friction member 208a, the pull-out force of the webbing 150 can be reduced. As a result, with the through-anchor 170 according to the present invention, not only can jamming be prevented during a vehicle emergency but a pull-out force of the webbing 150 can also be reduced during normal use.

Pull-out forces of a webbing when respectively inserted through the through-anchor 170 and a conventional through-anchor were measured using a so-called push-pull measuring device. To describe the measurement method with reference to, for example, FIG. 5A, first, a pull-out direction of the webbing was set such that, when viewed from a vehicle side surface side, the first webbing 150A that is positioned to the front of the vehicle with respect to the second webbing 150B forms an angle of about 55° with respect to the second webbing 150B. Furthermore, the pull-out direction of the webbing is set such that, when viewed from the front of the vehicle or from above the vehicle, the first webbing 150A that is positioned on a vehicle interior side with respect to the second webbing 150B that is positioned on a vehicle wall side respectively forms angles of about 35° with respect to the second webbing 150B when viewed from the front of the vehicle or from above the vehicle.

The first webbing 150A respectively inserted through the through-anchor 170 and a conventional through-anchor was pulled out for 300 mm using a push-pull measuring device in the pull-out direction described above and respective pull-out forces were measured. According to the measurement results, the pull-out force when using the conventional through-anchor was 9.5 N and the pull-out force when using the through-anchor 170 according to the present invention was 7.8 N. In other words, using the through-anchor 170 achieves a reduction in pull-out force of approximately 17% as compared to a conventional through-anchor.

Therefore, according to the through-anchor 170, even though a reduction in the pull-out force of the webbing during normal use can be achieved as described above, jamming and the like can be eliminated during a vehicle emergency as described earlier. Therefore, occupant restraining performance can be improved in comparison to conventional through-anchors.

While preferred embodiments of the present invention have been described with reference to the accompanying drawings, it is to be understood that the present invention is not limited to such embodiments. It will be obvious to those skilled in the art that various modifications and changes may be made without departing from the spirit and scope of the following claims, and it is intended to cover in the technical scope of the present invention all such modifications and changes.

In addition, while an example where a seatbelt device according to the present invention is applied to an automobile has been explained in the embodiments described above, a seatbelt device according to the present invention can also be applied to an airplane, a ship, and the like to achieve similar operational effects.

The present invention can be used in a seatbelt through-anchor through which a webbing for restraining an occupant is inserted and to a seatbelt device including the seatbelt through-anchor.

What is claimed is:

1. A seatbelt through-anchor which is rotatably attached to a vehicle interior wall and which is folded back after a band-shaped webbing extracted from a retractor is inserted through the seatbelt through-anchor, the seatbelt through-anchor comprising:
    an insertion hole through which the webbing is inserted, the insertion hole including an approximately linear lower edge which comes into contact with a surface of the webbing so as to traverse the webbing and on which the webbing slides, and a lateral edge extending in a curve from an end part of the lower edge;
    a lower-side part provided below the lower edge; and
    a bump part provided on a surface of the through-anchor so as to extend from a vicinity of an end of the lower-side part in a lateral direction of the through-anchor and protruding beyond a surface of the lower-side part in a direction corresponding to a vehicle interior side when the through-anchor is installed, wherein
    the bump part includes peak parts protruding the furthest in the course of separating from the lateral edge, and
    the bump part includes, between each of the peak parts and the lateral edge, a first sliding surface including at least a curved surface outwardly protruding from the through-anchor which comes into contact with a surface of the webbing and on which the webbing slides,
    wherein when the portion protruding from the lower-side part of the bump part is viewed in a cross section including the lower-side part, a foot part of the bump part has a shape that is outwardly receding from the through-anchor and a vicinity of each of the peak parts has a shape that is outwardly protruding from the through-anchor, and the bump part further includes a second sliding surface configured such that the receding shape and the protruding shape are smoothly connected to each other.

2. The seatbelt through-anchor according to claim 1, wherein a flat surface is included in a surface of the bump part from the foot part to each of the peak parts, and the flat surface is configured to be smoothly connected to the receding shape of the foot part and the protruding shape of the peak part.

3. The seatbelt through-anchor according to claim 1, wherein the first sliding surface and the second sliding surface are connected to each other by a smoothly continuous surface.

4. A seatbelt device comprising the seatbelt through-anchor according to claim 1.

5. A seatbelt through-anchor which is rotatably attached to a vehicle interior wall and which is folded back after a band-shaped webbing extracted from a retractor is inserted through the seatbelt through-anchor, the seatbelt through-anchor comprising:
    an insertion hole through which the webbing is inserted, the insertion hole including an approximately linear lower edge which comes into contact with a surface of the webbing so as to traverse the webbing and on which the webbing slides, and a lateral edge extending in a curve from an end part of the lower edge;
    a lower-side part provided below the lower edge; and
    a bump part provided on a surface of the through-anchor so as to extend from a vicinity of an end of the lower-side part in a lateral direction of the through-anchor and protruding beyond a surface of the lower-side part in a direction corresponding to a vehicle interior side when the through-anchor is installed, wherein
    the bump part includes peak parts protruding the furthest in the course of separating from the lateral edge, and
    the bump part includes, between each of the peak parts and the lateral edge, a first sliding surface including at least a curved surface outwardly protruding from the through-anchor which comes into contact with a surface of the webbing and on which the webbing slides,
    wherein the bump part includes the first sliding surface between a ridge line formed by connecting the peak parts and the lateral edge.

6. The seatbelt through-anchor according to claim 5, wherein the ridge line is formed along the shape of the lateral edge.

7. A seatbelt device comprising the seatbelt through-anchor according to claim 5.

8. A seatbelt through-anchor which is rotatably attached to a vehicle interior wall and which is folded back after a band-shaped webbing extracted from a retractor is inserted through the seatbelt through-anchor, the seatbelt through-anchor comprising:
    an insertion hole through which the webbing is inserted, the insertion hole including an approximately linear lower edge which comes into contact with a surface of the webbing so as to traverse the webbing and on which the webbing slides, and a lateral edge extending in a curve from an end part of the lower edge;
    a lower-side part provided below the lower edge; and
    a bump part provided on a surface of the through-anchor so as to extend from a vicinity of an end of the lower-side part in a lateral direction of the through-anchor and protruding beyond a surface of the lower-side part in a direction corresponding to a vehicle interior side when the through-anchor is installed, wherein when the portion protruding from the lower-side part of the bump part is viewed in a cross section including the lower-side part, a foot part of the bump part has a shape that is outwardly receding from the through-anchor and a vicinity of each of peak parts of the bump part has a shape that is outwardly protruding from the through-anchor, and the bump part includes a second sliding surface configured such that the receding shape and the protruding shape are smoothly connected to each other.

9. The seatbelt through-anchor according to claim 8, wherein a flat surface is included in a surface of the bump part from the foot part to each of the peak parts, and the flat surface is configured to be smoothly connected to the receding shape of the foot part and the protruding shape of the peak part.

10. A seatbelt device comprising the seatbelt through-anchor according to claim 8.

11. A seatbelt through-anchor which is rotatably attached to a vehicle interior wall and which is folded back after a band-shaped webbing extracted from a retractor is inserted through the seatbelt through-anchor, the seatbelt through-anchor comprising:

an insertion hole through which the webbing is inserted, the insertion hole including an approximately linear lower edge which comes into contact with a surface of the webbing so as to traverse the webbing and on which the webbing slides, and a lateral edge extending in a curve from an end part of the lower edge;

a lower-side part provided below the lower edge; and a bump part provided on a surface of the through-anchor so as to extend from a vicinity of an end of the lower-side part in a lateral direction of the through-anchor and protruding beyond a surface of the lower-side part in a direction corresponding to a vehicle interior side when the through-anchor is installed, wherein the bump part includes peak parts protruding the furthest in the course of separating from the lateral edge, and the bump part includes, between each of the peak parts and the lateral edge, a first sliding surface including at least a curved surface outwardly protruding from the through-anchor which comes into contact with a surface of the webbing and on which the webbing slides, wherein the bump part is provided at least between a first straight line passing through the end part of the lower edge and extending in a shorter-side direction of the insertion hole and a second straight line passing through an endmost part at an outermost position of the lateral edge and extending in a longitudinal direction of the insertion hole.

12. A seatbelt device comprising the seatbelt through-anchor according to claim 11.

* * * * *